United States Patent [19]

Bertling et al.

[11] Patent Number: 4,736,646
[45] Date of Patent: Apr. 12, 1988

[54] BRAKE PRESSURE CONTROL VALVE

[75] Inventors: Hannes Bertling, Vaihingen/Enz; Heinz Leiber, Oberriexingen; Robert Mergenthaler, Markgroningen; Heinz Siegel, Stuttgart, all of Fed. Rep. of Germany

[73] Assignee: Robert Bosch GmbH, Stuttgart, Fed. Rep. of Germany

[21] Appl. No.: 800,571

[22] Filed: Nov. 21, 1985

[30] Foreign Application Priority Data

Jan. 26, 1985 [DE] Fed. Rep. of Germany ....... 3502614

[51] Int. Cl.$^4$ .......................... G05G 9/00; B60T 13/00
[52] U.S. Cl. ......................................... 74/470; 74/582; 60/562
[58] Field of Search .......................... 74/470, 512, 582; 403/50, 203, 164, 132, 372; 60/562

[56]  References Cited

U.S. PATENT DOCUMENTS

| 2,749,757 | 6/1956 | Adelt | 403/50 |
|---|---|---|---|
| 2,762,083 | 9/1956 | Noguera | 403/203 |
| 2,793,501 | 5/1957 | Rike | 403/51 |
| 3,010,772 | 11/1961 | Kellogg et al. | 403/132 |
| 3,173,266 | 3/1965 | Shutt | 403/164 |
| 4,077,217 | 3/1978 | Leiber | 60/562 |
| 4,200,001 | 4/1980 | Kytta | 74/512 |
| 4,225,022 | 9/1980 | Belart | 60/562 |
| 4,296,604 | 10/1981 | Kizaki et al. | 60/562 |
| 4,404,803 | 9/1983 | Steffes | 60/563 |
| 4,455,831 | 6/1984 | Maehara | 60/562 |

FOREIGN PATENT DOCUMENTS 2128279 4/1984 United Kingdom .

Primary Examiner—Randolph A. Reese
Assistant Examiner—Peter M. Cuomo
Attorney, Agent, or Firm—Edwin E. Greigg

[57]  ABSTRACT

A brake pressure control valve including a housing, a control bushing secured therein, a control slide and a travel simulator movable relative to the control bushing and having a spring. The travel simulator has a pressure piece which is rounded on its side toward the control slide. Toward the pressure piece, the control slide is also rounded. Between the control slide and the pressure piece there is a force transmitting member having two plane parallel end faces. A centering means surrounding the force transmitting member and embodied like a rubber-elastic bushing centers the force transmitting member relative to the longitudinal axis of the control slide and orients the end faces transversely to said longitudinal axis. The control slide, the force transmitting member and the pressure piece form roller pairs, which during the actuation of the brake pressure control valve enable relative movements between the pressure piece and the control slide without generating notable radial force components.

8 Claims, 1 Drawing Sheet

BRAKE PRESSURE CONTROL VALVE

BACKGROUND OF THE INVENTION

This invention is based on a brake pressure control valve for a hydraulic brake system. Brake pressure control valves having a control bushing, a control slide and a travel simulator, intended for displacing the control slide and containing at least one spring, are well known. In a brake pressure control valve according to British Patent No. 2,128,279 A, the travel simulator comprises a conically shaped spring having a thick end which is engaged by an actuating tappet and a thinner end which points toward the control slide. The spring serves to displace the control slide and compensates for errors in alignment between the paths of movement of the control slide and actuating tappet. A disadvantage is that depending on how the spring is compressed, the direction in which it acts extends obliquely to the longitudinal axis of the control slide in an unpredictable manner. As a result, not only displacement forces but unpredictable shear forces as well act upon the control slide. These shear forces cause frictional resistance and hence prevent precise metering of the pressures, especially at low brake pressures.

OBJECT AND SUMMARY OF THE INVENTION

The brake pressure control valve has the advantage that unavoidable errors in alignment of the travel simulator relative to the longitudinal axis of the control bushing do not result in any notable shear forces on the control slide. Accordingly, less disruptive friction occurs, and brake pressures can be controlled more sensitively. The reduction in shear forces has the further advantage that the control slide and the spring can be embodied with smaller cross sections than has heretofore been conventional. This lowers costs and promotes the wider use of advantageous brake systems having hydraulic brake boosters.

Advantageous further embodiments of and improvements to the brake pressure control valve disclosed are attainable with embodiments that can be produced economically.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
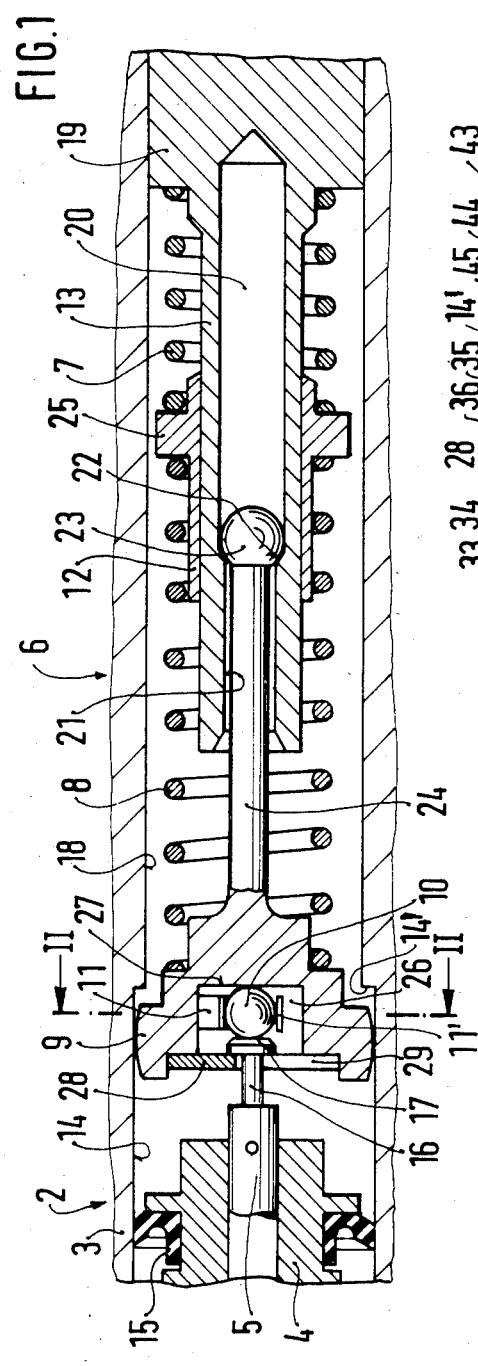
FIG. 1 is a partial longitudinal section taken through a first exemplary embodiment of the brake pressure control valve according to the invention.

The first exemplary embodiment of the brake pressure control valve 3 according to FIG. 1 has a housing 3, a control bushing 4, a control slide 5, a travel simulator 6 with two axially aligned springs 7, 8, a guide head 9, a force transmitting member 10, a centering means 11, a spring guide sleeve 12 and a guide tube 13 coaxial with the spring guide sleeve.

The housing 3 has a cylindrical bore 14, inside which the control bushing 4 is secured. At least one sealing ring 15 is installed between the bore 14 and the control bushing 4. The control slide 5 is embodied in a manner known per se and has a neck 16, which is adjoined by a head 17, which is defined with a flat facial surface, transversely to the longitudinal axis of the neck 16.

In the extension of the bore 14, the housing 2 has a bore 18. The guide tube 13 is disposed coaxially with this bore 18. The guide tube 13 is formed as an extension on an actuation tappet 19, which is longitudinally displaceable inside the bore 18. The actuating tappet is coupled in a manner known per se with a pedal or similar actuating means, not shown. Beginning at the actuating tappet 19, the guide tube 13 has a longitudinal bore 20 and adjacent to the longitudinal bore 20 in the direction toward the control bushing 4, bore 21 of lesser diameter than bore 20 extends in axial alignment therewith. A shoulder 22 is located between the bores 20 and 21. A ball-like guide body 23 is disposed longitudinally displaceable inside the bore 20. This guide body 23 is joined via a stem 24 with the spring guide head 9. The spring guide head 9 is displaceable inside the bore 14 toward the control bushing 4 and limited in movement in the opposite direction by a shoulder 14'. On the outside, the guide tube 13 has the spring guide sleeve 12, which is longitudinally displaceable on the guide tube 13. The spring guide sleeve 12 has a radially offstanding collar 25. The spring 7 is disposed between this collar 25 and the actuating tappet 19. The spring 8 is adjacent to the opposite side of the collar 25 and extends to the spring guide head 9, which centers this spring 8. The springs 7 and 8 are installed with an initial tension, so that the spring guide head 9, by means of the stem 24, pulls the guide body 23 against the shoulder 22. A displacement of the actuating tappet 19 in the direction of the control bushing 4 accordingly initially causes a displacement of the spring guide head 9 as well. Subsequently, for instance as a result of a displacement resistance on the part of the control slide 5, the springs 7 and 8 may become compressed. The spring guide head 9 is the moved in the opposite direction no later than whenever the springs 7 and 8 as the actuating tappet 19 moves back again, have caused the guide body 23 to rest against the shoulder 22.

The spring guide head 9 has a centrally arranged recess 26 extending in its longitudinal direction, which is defined by a flat end face 27 oriented transversely. This end face 27 serves as a rolloff surface for the force transmitting member 10, which in this example is embodied as a ball. The head 17 of the control slide 5 is located opposite the end face 27. A locking washer 28, which has a slit 29 extending from its center, is oriented transversely to the longitudinal axis of the control slide and is combined with the spring guide head 9. The locking washer 28 surrounds the neck 16. The width of the slit 29 is selected such that this slit is spaced apart by a minimum distance from the neck.

The centering means 11 is embodied by way of example in the form of four leaf springs. The leaf springs 11 are located in four planes, which are oriented substantially parallel to the longitudinal axis of the spring guide head 9. Free ends 11' of these leaf springs contact the ball 10 at a tangent. Two ends 11' of the leaf springs 11 are secured in the spring guide head 9. The leaf springs 11 are capable of centering the ball 10 with respect to the longitudinal axis of the spring guide head 9 whenever the ball 10 is not imprisoned between the spring guide head 9 and the head 17.

The brake pressure valve operates in the following manner:

If the actuating tappet is moved from the non-braking position shown toward the control bushing 4, for instance by means of a pedal, the springs 7 and 8 press the spring guide head 9 and its end face 27 against the ball 10. As a result, the ball 10 is pressed against the head 17 of neck 16, with the result that the control slide 5 is pushed more deeply into the control bushing 4. If relative movements transverse to the direction of movement of the control slide 5 occur, because of errors in alignment between the longitudinal axis of the control slide 4 and the spring guide head 9 or because of play on the part of the spring guide head 9 inside the bore 14, then the ball 10 rolls off both the end face 27 and the head 17. The forces thereby exerted transversely to the longitudinal axis of the control slide are very slight, because of the rolling off of the ball 10. The leaf springs 11 can be quite soft, so that they do not exert any disruptive shear forces upon the control slide 5. If the actuating tappet 19 is retracted into the starting non-braking position shown, then the forces engaging the ball 10 diminish. This enables the centering means 11 to move the ball 10, which may have moved out of its original alignment, back into its starting po ition again. It should also be noted in this respect that spring wires ca be installed instead of the leaf springs 11 shown. The centering means 11 no matter how they are embod:ed, have the effect that after a given braking event has ended, that is, whenever the ball-like force transmitting member 10 has no forces to transmit, this force transmitting member 10 returns exactly to its starting position, so that at the beginning of each braking event, there is sufficient reserve travel available for the force transmitting member 10.

Figure 3:
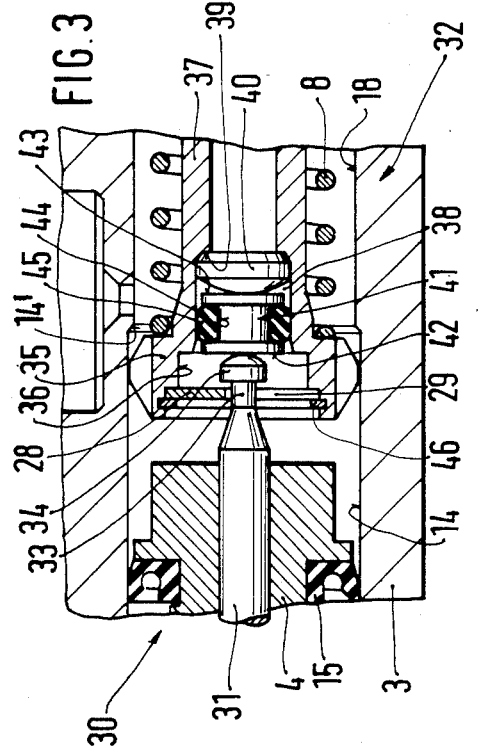
FIG. 3 is a partial longitudinal section taken through a second exemplary embodiment of the brake pressure control valve.

The second exemplary embodiment of the brake pressure control valve 30 shown in FIG. 3 has a housing 3, a control bushing 4, a control slide 31, at least one seal 15 and a travel simulator 32.

The control bushing 4 and the sealing ring 15 are again installed in a bore 14 located in the housing 3. This bore 14 is again adjoined coaxially by a bore 18 by shoulder 14'. The control slide 31 has, in addition to the control bushing 4, a neck 33 and a head 34 borne by this neck. In contrast to the head 17 of the first exemplary embodiment, this head 34 is rounded on its side remote from the neck 33. The travel simulator 32 also has a spring guide head 35, which is longitudinally displaceable inside the bore 14 and has a recess 36, which surrounds the head 34 with radial spacing. Adjoining the spring guide head 35 is a stem 37. Beginning at the recess 36 is a second recess 38, having a smaller diameter than the recess 36. The recess 38 ends at a shoulder 39. A pressure piece 40 is inserted into the recess 38, resting on the shoulder 39. On its side oriented toward the control slide 31, this pressure piece 40 is rounded. A force transmitting member 41 is again inserted between the pressure piece 40 and the head 34. Adjacent to the head 34 and the pressure piece 40, it has plane parallel end faces 42 and 43. The diameters of the end faces are for intance at least as large as a distance by which they are spaced apart, so that the head 34 and the pressure piece 40 can be spaced apart from one another by a relatively short distance. At its circumference, the force transmitting member has a groove 44, into which a centering means 45 protrudes. This centering means 45 is embodied as a bushing and comprises a rubber-like, elastic material; it surrounds the force transmitting member 41 and is simultaneously supported in the recess 38. The bushing-like centering means 45 centers the force transmitting member 41 inside the recess 38 in the radial direction, as long as the pressure piece 40 is not exerting pressure on the force transmitting member 41, and also aligns the member 41 parallel to the longitudinal axis of the control slide 31. A locking washer 28 is again inserted into the spring guide head 36 and has a slit 29. The slit 29 encompasses the neck 33 with a radial spacing. The head 34 is located beside the locking washer 28. A locking ring 46 holds the locking washer 28 firmly in the spring guide head 35. The spring 8 of the travel simulator 32 engages the side of the spring guide head 35 remote from the control bushing 4.

If pressure is exerted upon the spring 8, for instance as in the first exemplary embodiment, by means of an actuating tappet, not shown then the spring 8 displaces the spring guide head 35 along with the stem 37 toward the control slide 4. As a result, the pressure piece 40 is moved toward the control slide 31. As a result, the pressure piece 40 displaces the head 34 via the force transmitting member 41, finally causing the control slide 31 to be moved as well. If relative movements between the head 34 and the pressure piece 40 occur during the movement of the control slide 31 in the radial direction, the force transmitting member 41 tilts back and forth, and its end face 42 rolls off on the head 34 and its end face 43 rolls off on the pressure piece 40. The centering means 45 is elastically deformed as a result. Now if the actuating tappet is moved back toward its original non-braking position, the spring guide head 35 moves away from the control bushing 4, and the positive connection between the force transmitting member 41 and the head 35, as well as with the pressure piece 40, is reduced and finally ended. As a result, the centering means 45 is capable of tipping the force transmitting member 41 back into its original position. As will be appreciated from the description, sliding friction between the travel simulator 32 and the head 34 is avoided. Therefore only slight forces act in the radial direction, because of the inherently very low rolling resistance and because of a force which is dictated by the usually very light elastic deformation of the centering means 45, which can be embodied as very soft.

Figure 2:
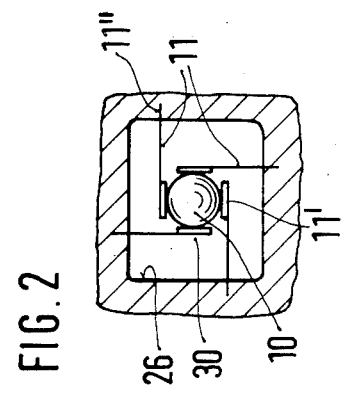
FIG. 2. is a cross section taken through the brake pressure control valve according to FIG. 1.

From FIGS. 1–3 it is readily apparent that the force transmitting members 10 and 41 that compensate virtually without friction for the radial misalignments occupy little space in comparison with link rods, and as a result the brake pressure control valves 2 and 30, along with their travel simulators 6 and 32, can be relatively short. This reduces construction costs. The compensation of radial misalignments has the advantage already mentioned in the introduction hereto, that is, that the brake pressure control valve 2 or 30 is actuatable in a precise manner.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A brake pressure control valve for a hydraulic brake system comprising a longitudinal housing, a control bushing (4) mounted within said housing, an axially extending control slide (5) operative for axial movement in said control bushing along a longitudinal axis and a travel simulator (6) in axial alignment with said control bushing, said travel simulator includes an actuating member, at least one member (7,8) being coaxially arranged with said actuating member and being substantially elastic in a longitudinal axial direction of the control slide, said at least one member being movable counter to the control slide by means of said actuating member 19 in a direction toward said control bushing, a force transmitting means (10,41) disposed between said control slide and said actuating member, said force transmitting means includes roller surfaces (17,27) which have a relative movement path extending substantially transversely to the longitudinal axis of the control slide and said force transmitting means includes a centering means which is elastic at least radially to the longitudinal axis of the control slide and surrounds said force transmitting means.

2. A brake pressure control valve as defined by claim 1, in which said force transmitting member is embodied as a ball.

3. A brake pressure control valve as defined by claim 2, in which said control slide and a component part of said travel simulator each include a flat surface adahacent said ball transversely to the longitudinal axis of the control slide.

4. A brake pressure control valve as defined by claim 3, in which said component part of said simulator is a guide head, said guide head includes an axially aligned stem, a guide body on said stem, a guide tube surrounding said guide body, said guide body extending in axial alignment from a tappet, a guide sleeve surrounding said guide tube, said guide sleeve including a radially extending collar, a first spring surrounding said guide tube between said tappet and said collar, and a second spring between said guide head and said collar.

5. A brake pressure control valve as defined by claim 1, in which said force transmitting member has substantially identical dimensions along and transversely to the longitudinal axis of said control slide and has two plane parallel end faces adjacent rounded end faces of said control slide and a component part of said travel simulator.

6. A brake pressure control valve as defined by claim 1, in which said centering means comprises at least three leaf springs which are oriented in planes substantially parallel to the longitudinal axis of the control slide and are secured on a component part of said travel simulator.

7. A brake pressure control valve as defined by claim 6, in which said centering means comprises at least four leaf springs which are oriented in planes substantially parallel to the longitudinal axis of the control slide and are secured on a component part of said travel simulator.

8. A brake pressure control valve as defined by claim 1, in which said centering means is embodied in the form of a rubber-like, elastic bushing, and that said centering means is supported by a component part of said travel simulator.

* * * * *